July 23, 1946.  C. A. VOLF  2,404,673
CARGO CARRIER
Filed July 3, 1942  6 Sheets-Sheet 1

Inventor
Christian A. Volf,
By Martin T. Fisher, Attorney

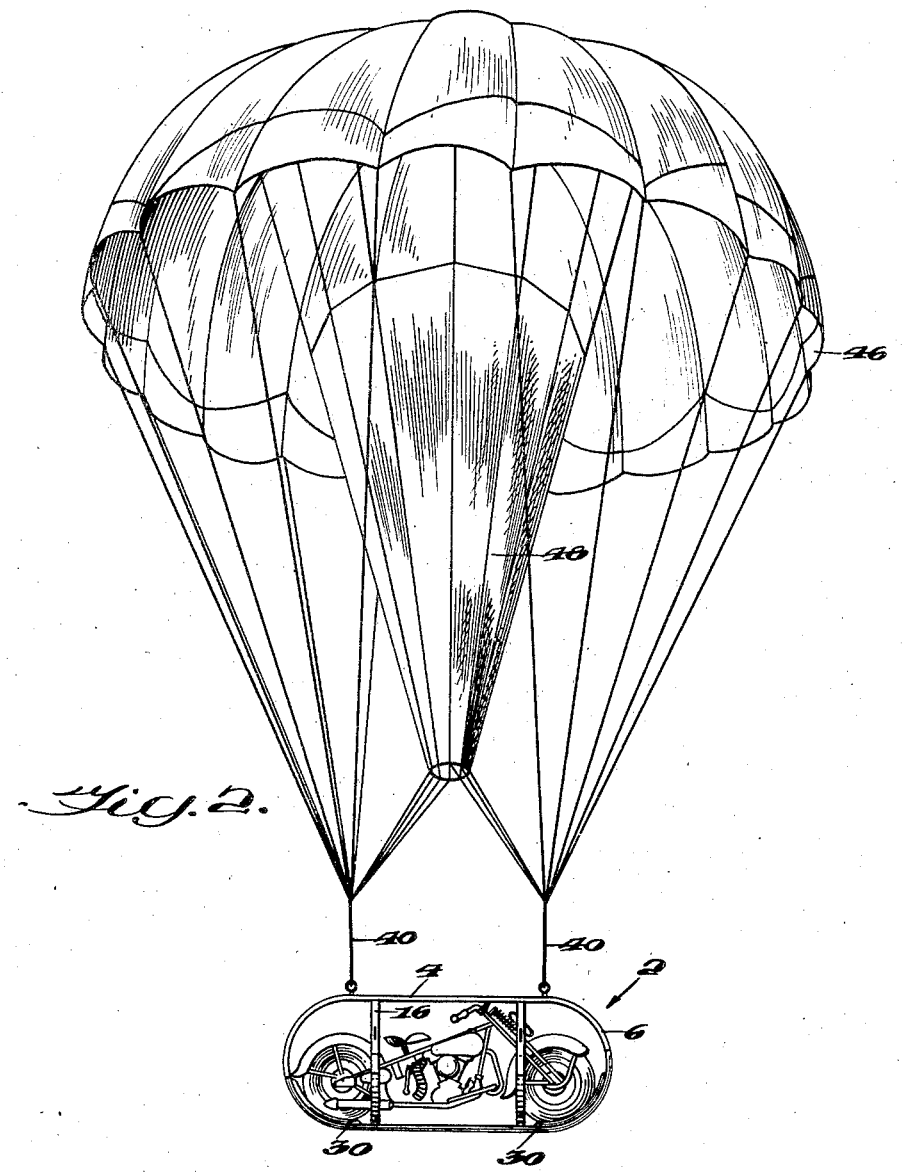

July 23, 1946.    C. A. VOLF    2,404,673
CARGO CARRIER
Filed July 3, 1942    6 Sheets-Sheet 3
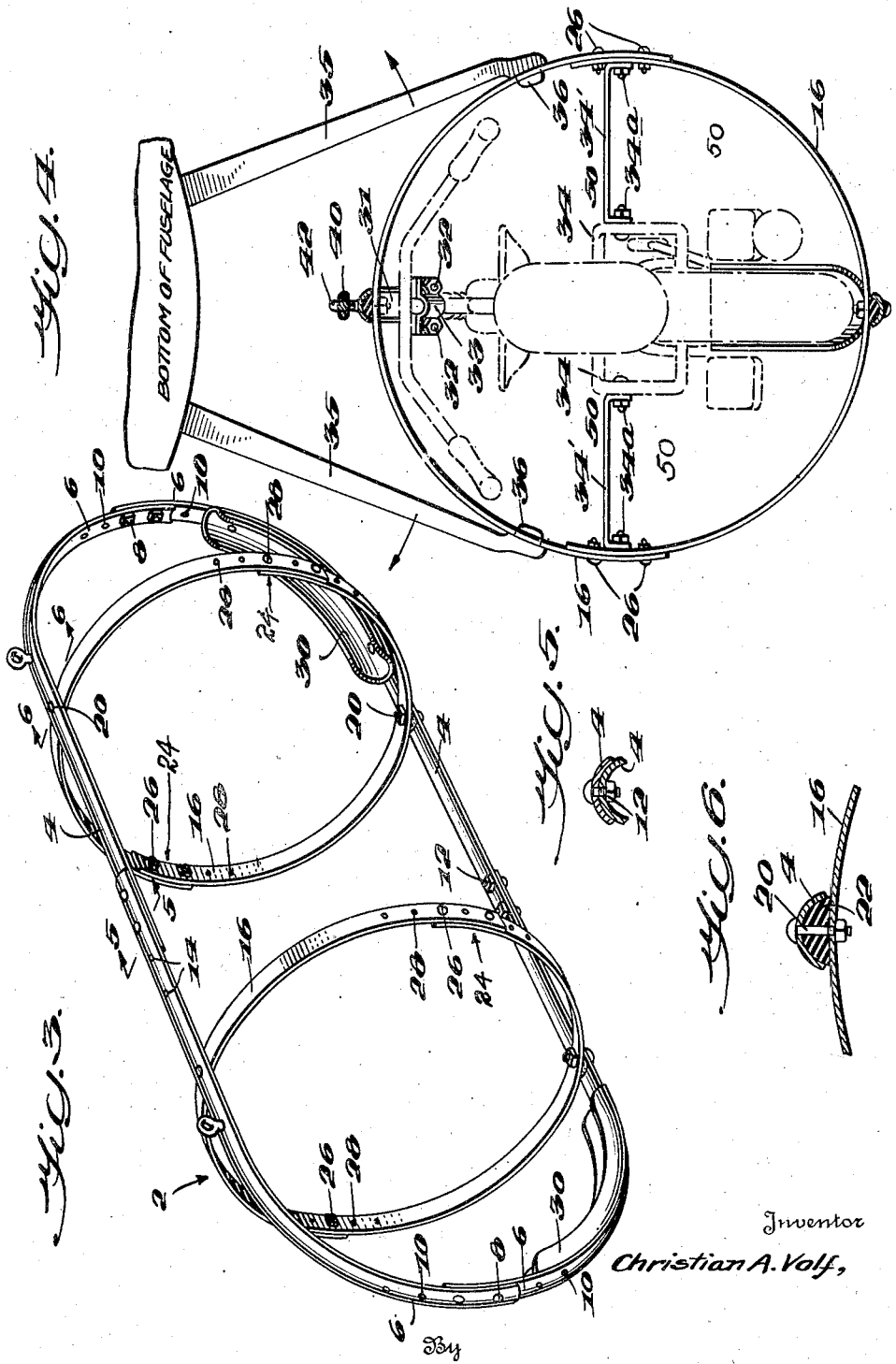

July 23, 1946.  C. A. VOLF  2,404,673
CARGO CARRIER
Filed July 3, 1942  6 Sheets-Sheet 4

Inventor
Christian A. Volf,
By
Martin T. Fisher,
Attorney.

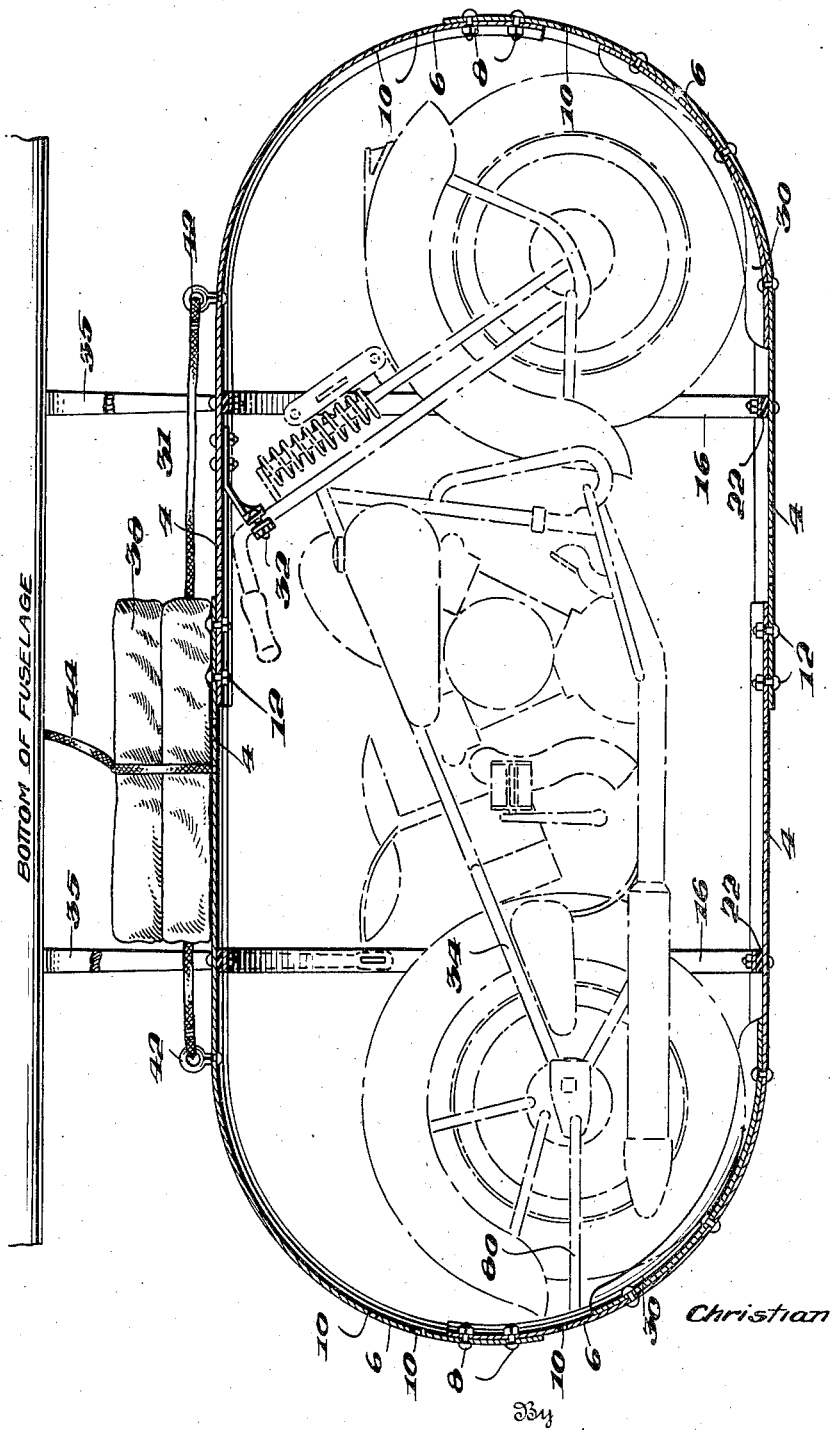

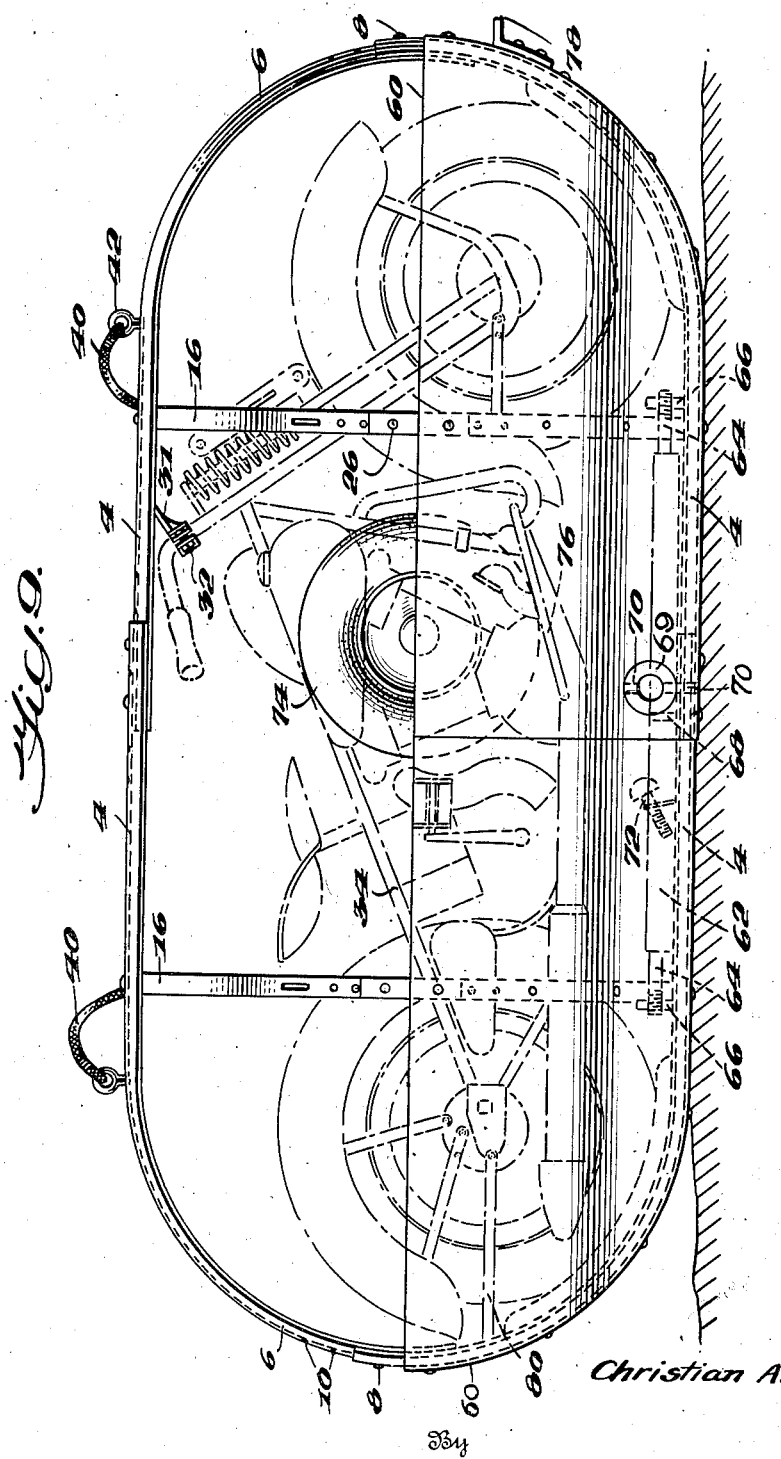

Patented July 23, 1946

2,404,673

UNITED STATES PATENT OFFICE 2,404,673

CARGO CARRIER

Christian A. Volf, Los Angeles, Calif.

Application July 3, 1942, Serial No. 449,638

15 Claims. (Cl. 206—46)

This invention is a cargo carrier capable of general application. More particularly, however, the cargo carrier is for use in dropping cargo from an airplane by means of a parachute.

The principal object of the invention is to provide a cargo carrier which will protect the cargo sufficiently when it hits the ground and which may be quickly disassembled for obtaining access to whatever is in the cargo carrier.

Another important object of the invention is to provide a cargo carrier which, when it hits the ground, will not be checked instantly but will roll along the ground, some of the force of the fall being dissipated as the carrier rolls along the ground.

Another important object of the invention is to provide a cargo carrier, the length, width and height of which may be varied to accommodate cargo of different sizes.

While the invention will be described particularly for use in dropping a motorcycle as the cargo from an airplane, the invention is not to be limited to such cargo, but is of general application.

After the carrier has landed, it may be readily disassembled by the removal of suitable quick-detachable fastenings, such as ordinary bolts, and the motorcycle or other cargo quickly removed.

The framework of the carrier is of metal which would have a substantial degree of resiliency for absorbing shocks as it hits the ground. The carrier is, in effect, a springy cage, which will absorb a large part of the shock of landing. Most cargoes will stand a considerable landing shock, and a motorcycle, which is very sturdily built, will stand the shock of landing, especially with this invention, where the carrier is not checked as soon as it hits the ground, the force of the fall being gradually dissipated as the carrier rolls along the ground.

In one aspect of the invention, the cargo carrier, after landing, may have a pair of wheels attached thereto and be coupled to the rear of the motorcycle, thereby forming a trailer.

The cargo carrier, instead of being used for dropping cargo from an airplane, may be used for shipping freight generally, particularly motorcycles; after the motorcycle or other freight has been removed, the carrier may be reassembled and used over and over again and not discarded, as is often the case.

Further advantages of construction and operation will be brought out in connection with the accompanying drawings, illustrating certain embodiments of the invention.

In these drawings:

Fig. 2 shows the carrier descending by parachute from the plane.

Fig. 3 is a perspective view of one form of the carrier.

Fig. 4 is an end view showing the carrier in place below the fuselage.

Figs. 5 and 6 are sectional views of details on the lines 5—5 and 6—6 of Fig. 3, respectively.

Figure 7:
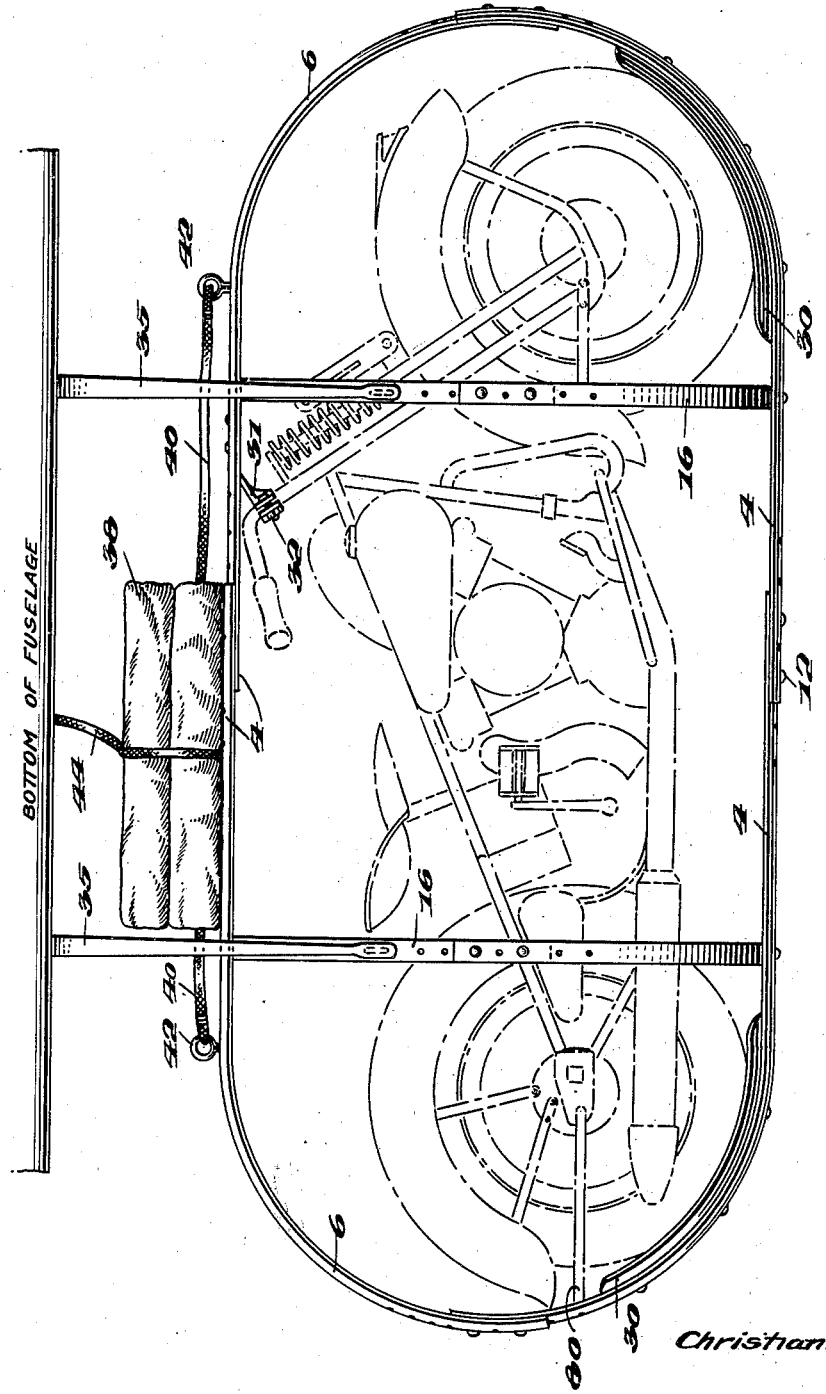

Fig. 7 is a side view of the carrier.

Fig. 8 is a longitudinal vertical section through the carrier.

Figure 1:
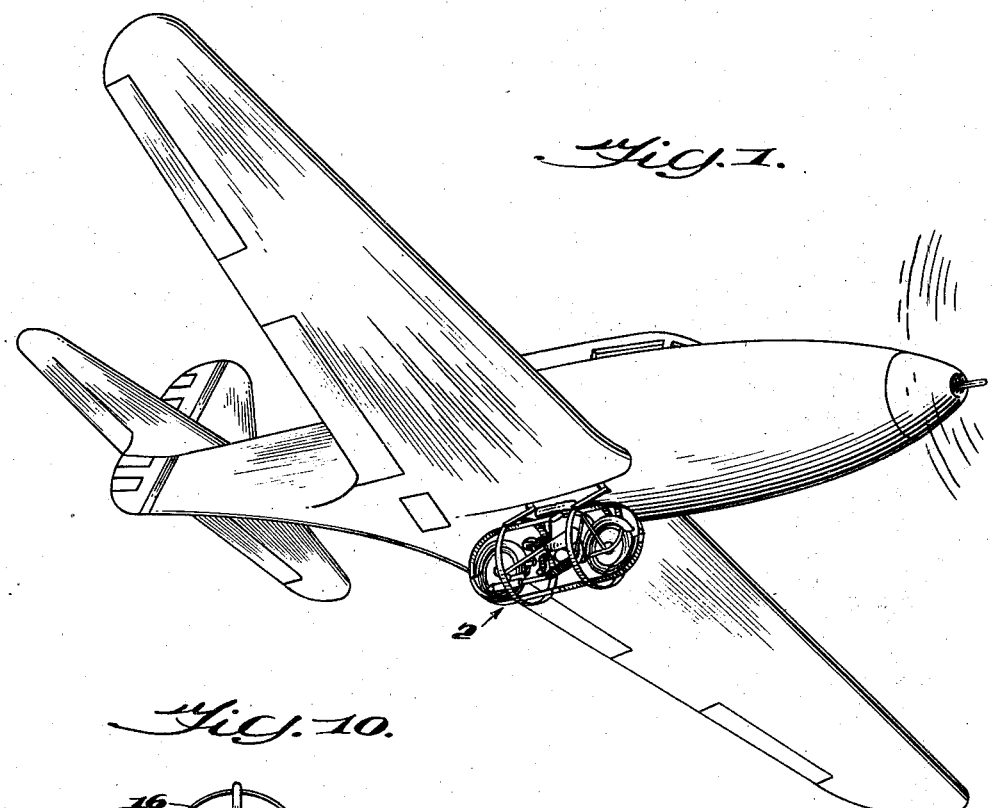
Fig. 1 shows the carrier of the present invention suspended below the fuselage of an airplane.
Figure 10:
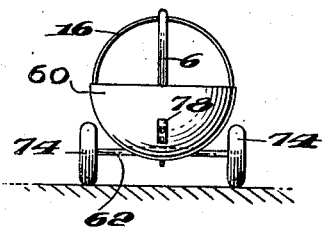
Figure 11:
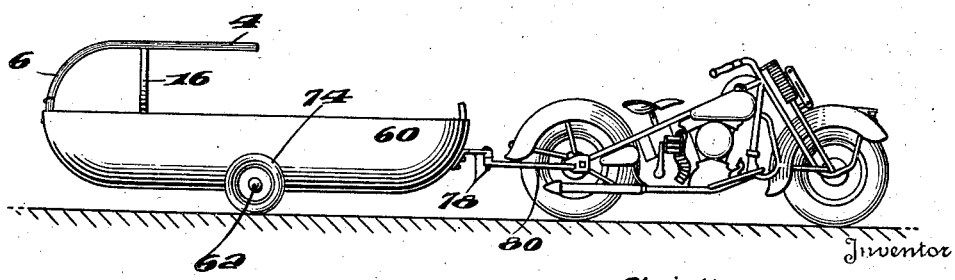

Fig. 9 is a side view of a modification, where part of the carrier forms a trailer; and Figs. 10 and 11 are end and side views, respectively, showing the carrier in use as a trailer.

Referring now to these drawings, in which similar reference characters indicate similar parts, the cargo carrier indicated generally at 2, comprises longitudinal frame members 4, which for the most part are straight, the ends 6, however, being curved into overlapping relationship and being secured together by any type of quickly attachable connection, such as bolts and nuts 8. These curved ends are provided with a number of holes 10 for the bolts, to give a variable overlap, whereby the effective vertical dimension of the carrier can be varied.

The straight portions of the frame members are in overlapping relationship and held by quick-detachable connections such as bolts 12, a number of holes 14 being provided so that the frame members are variably positionable, whereby the effective length of the frame may be varied. As shown in Fig. 5, the frame members 4 are longitudinally curved, this longitudinal curvature serving to stiffen the frame members lengthwise. This curvature extends into the curved ends 6 of the members 4 also.

The cargo carrier also includes transversely positioned bands 16, secured by readily detachable bolts 20 to the longitudinal frame members 4; two of such bands are shown in Fig. 3, but any desired number may, of course, be used. Furthermore, the transversely positioned bands 16 may, if desired, be pivotally mounted at diametrically opposite points, on the longitudinal frame members 4 by the bolts 20, whereby the circular frame members 16 may be swung about their pivots into and out of the plane of the longitudinal frame members 4. By this structure a unitary, knockdown, cargo carrier is produced which may be shipped flat, thus occupying the minimum amount of space, thereby enabling a plane to carry a number of such crates in a minimum amount of space. It is obvious that with this structure the transversely positioned frame members 16 would be inset on the longitudinal frame member 4 so as to clear the curved ends 6 or the channel members 30. With certain cargoes, the channel members 30 may evidently be omitted. A block of rubber or the like 22 may be positioned between frame 4 and bands 16 for providing a tight, resilient connection.

The bands 16 may be in one piece, in which case where different sized carriers are desired, different sized bands would be used. However, preferably the bands are in two semi-circular segments which overlap as at 24, the overlapping ends being detachably secured by bolts 26, additional holes 28 being provided for varying the effective size of the bands. The bands 16 are of metal and are strong and resilient.

Where the cargo to be carried is a motorcycle, the curved ends 6 of the lower frame members are provided with channel members 30 for snugly and tightly receiving the tires of the motorcycle. The cycle is further secured in place by a bracket 31, bolts 32 and clamping plate 33 clamped to the steering column of the cycle, the upper end of the bracket being bolted to one of the frame members 4 for rigidly securing the upper part of the motorcycle in place in the carrier. Additional braces may be provided, if necessary.

In order further to hold the rear end of the motorcycle, use is made of the two guard rails or bars 34 customarily carried by the motorcycle. Braces 34', Fig. 4, are detachably secured at their outer ends to one of the bands 16, and at their inner ends to the guard rails 34, by bolts and clamps 34a, thereby rigidly holding the rear part of the motorcycle in the carrier.

The carrier of the present invention is detachably secured below the fuselage of an airplane in any suitable way, as for example, by arms 35 which may be provided with pins 36 for engaging through suitable holes in the bands 16. When arms 35 are moved outwardly in the direction of the arrows, the carrier will be released from the plane.

A parachute 38 is mounted on top of the carrier in collapsed position, as shown in Fig. 7. Cords or cables 40 from the parachute are secured to the cargo carrier 2 as by eyes 42 secured to the frame members 4. A rip-cord 44 has its upper end secured to the fuselage so that after the carrier has dropped a certain distance the parachute will be opened.

Any desired type of parachute may be used. In Fig. 2 there is illustrated a parachute 46 provided with a cone 48 of a type invented by me and claimed in applications pending in the Patent Office.

Upon releasing the carrier by the arms 34, the carrier starts to drop, the rip-cord opens the parachute, and the carrier descends as in Fig. 2. When the carrier hits the ground, a considerable part of the shock is taken up by the carrier which acts as a resilient cage. With a parachute, there is usually some lateral drift, and this lateral drift, together with any slope on which the carrier may land, will cause the carrier to roll along on the bands 16 which act as tires, so that the descent of the carrier is not suddenly checked, the force of the fall being further dissipated by this rolling action. In this rolling action, the eyes 42 will act somewhat as a brake in bringing the rolling carrier to a stop. The oil and fuel tanks on the motorcycle are sealed before release from the plane to prevent loss of these liquids.

After landing, the motorcycle is readily removed by releasing bracket 32, bolts 12 and 34a.

When the motorcycle is in position in the carrier there is additional space as shown at 50 in Fig. 4 and this space may, if desired, be utilized for carrying additional cargo, such as food, rifles, ammunition, oil, water, fuel, etc. If two bands 16 are not sufficient for confining such extra cargo, additional bands may, of course, be provided.

After the motorcycle has been removed, in case the carrier has not been too badly damaged in landing, it may be reassembled and used again.

The carrier described may also be used for shipping a motorcycle by freight or express, the adjustability provided by the overlapping ends 6 of the longitudinal frame members and by the overlapping ends 24 of the circular bands providing adjustability for accommodating motorcycles of various sizes. If the motorcycle has been removed, the framework may evidently be used over and over again, thereby effecting a saving of labor as well as wood over the ordinary wooden crate in which motorcycles are shipped. Furthermore, the motorcycle may be shipped by means of the present carrier in completely assembled relation so that it is ready for instant use as soon as it is removed from the carrier.

One of the important aspects of the present invention is that shown in Fig. 9, where the carrier is readily converted into a trailer for the motorcycle.

Referring now to Figures 9, 10 and 11, the framework of the carrier is substantially as shown in Fig. 3. Approximately the lower half of the carrier is provided with a curved cover of sheet material indicated generally at 60 formed of sheet metal or plywood, for example. This cover 60 is secured to the lower framing elements 4 and to the lower halves of the bands 6, by spot welding, bolts, etc., so that such of the upper portions of the framework as may be necessary may readily be removed by releasing the bolts 8 of the longitudinal frame members and 26 of the bands 16.

Detachably secured in any suitable position in the carrier is an axle, diagrammatically shown at 62, provided with bearings 64 for wheels and with nuts 66 for holding the wheels in place thereon.

The carrier is provided with a transversely extending bearing sleeve indicated diagrammatically at 69, extending transversely through the sheet material 60 and secured thereto. The axle may be centered in this bearing by providing a hole 68 therein, which is adapted to register with holes 70 in the bearing, a bolt or pin 72 being dropped through these holes for positioning the axle.

Wheels 74 for use with the described axle may be secured to the motorcycle by positioning them on the floorboards 76 and securing them by heavy cord or wire.

After the carrier has landed, the upper half is disassembled sufficiently for removing the motorcycle, the axle 62 is positioned in its bearing and centered by bolt 72, and the two wheels 74 are positioned on their bearings 64, thereby producing a trailer which may be coupled to the rear of the motorcycle by a trailer coupling 78, of any suitable type. The trailer coupling 78 may be secured to the usual rear parking stand 80 of the motorcycle.

There is thus provided a cargo carrier which not only will serve to lower the motorcycle to the ground, but will provide a trailer for almost instant use with the motorcycle.

While the invention has been illustrated in some detail, it should be understood that the invention is not to be limited to the precise details illustrated, but may be carried out in other ways.

I claim as my invention:

1. A carrier for a wheeled vehicle, comprising a longitudinal frame, the ends of which are curved, curved channel members carried by certain of the curved portions of said frame for holding the wheels of the wheeled vehicle, and a plurality of transversely positioned circular bands, secured to the longitudinal frame, providing tires on which the carrier can roll, said longitudinal frame and said circular bands being formed of narrow, resilient, metallic strips, secured together to form a light, springy, shock-absorbing, open-work skeleton cage for the wheeled vehicle.

2. A carrier for a wheeled vehicle, comprising a longitudinal frame, the ends of which are curved, said frame including means for varying the effective size thereof, for accommodating wheeled vehicles of different dimensions, curved channel members carried by certain of the curved portions of said frame for holding the wheels of the wheeled vehicle, and a plurality of transversely positioned circular bands, secured to the longitudinal frame, providing tires on which the carrier can roll, said longitudinal frame and said circular bands being formed of narrow, resilient, metallic strips, secured together to form a light, springy, shock-absorbing, open-work skeleton cage for the wheeled vehicle.

3. A carrier for a wheeled vehicle, comprising a longitudinal frame, the ends of which are curved, said frame including means for varying the effective size thereof, for accommodating wheeled vehicles of different dimensions, curved channel members carried by certain of the curved portions of said frame for holding the wheels of the wheeled vehicle, and a plurality of transversely positioned circular bands, secured to the longitudinal frame, providing tires on which the carrier can roll, said circular bands being provided with variably positionable overlapping ends, for varying the effective diameter thereof, said longitudinal frame and said circular bands being formed of narrow, resilient, metallic strips, secured together to form a light, springy, shock-absorbing, open-work skeleton cage for the wheeled vehicle.

4. A carrier for a wheeled vehicle, comprising a longitudinal frame, the ends of which are curved, said frame comprising overlapping frame members, detachably secured together, for varying the effective size of the frame and for facilitating assembly and disassembly, curved channel members carried by certain of the curved portions of said frame for holding the wheels of the wheeled vehicle, and a plurality of transversely positioned circular bands, secured to the longitudinal frame, providing tires on which the carrier can roll, said longitudinal frame and said circular bands being formed of narrow, resilient, metallic strips, secured together to form a light, springy, shock-absorbing, open-work skeleton cage for the wheeled vehicle.

5. A carrier for a wheeled vehicle, comprising a longitudinal frame, the ends of which are curved, said frame comprising overlapping frame members, detachably secured together, for varying the effective size of the frame and for facilitating assembly and disassembly, curved channel members carried by certain of the curved portions of said frame for holding the wheels of the wheeled vehicle, and a plurality of transversely positioned circular bands, secured to the longitudinal frame, providing tires on which the carrier can roll, said circular bands being provided with variably positionable overlapping ends, for varying the effective diameter thereof, said longitudinal frame and said circular bands being formed of narrow, resilient, metallic strips, secured together to form a light, springy, shock-absorbing, open-work skeleton cage for the wheeled vehicle.

6. A cargo carrier for use in dropping cargo from an airplane, comprising longitudinal and lateral frame members, the lateral frame members being circular so that the carrier will roll along the ground upon landing, wheels and an axle therefor, in disassembled position in the carrier, and bearing means for holding the axle in operative position, whereby the carrier, after landing, is convertible into a trailer.

7. A cargo carrier for use in dropping cargo from an airplane, comprising longitudinal and lateral frame members comprising quick-detachable connections whereby the carrier may be disassembled, sheet material for forming a trailer body carried by approximately the lower half of the carrier, wheels and an axle therefor, in disassembled position in the carrier, and bearing means for said axle in said lower half of the carrier, whereby it may readily be converted into a trailer.

8. A cargo carrier for use in dropping a motorcycle and trailer from an airplane, comprising longitudinal frame members, the ends of which are curved, channel members carried by certain of said curved ends of the frame for holding the tires of the motorcycle, transversely positioned circular frame members secured to the longitudinal frame members, wheels and an axle therefor, in disassembled position in the carrier, and having means for holding the axle in operative position, whereby the carrier, after landing, is convertible into a trailer for the motorcycle.

9. A cargo carrier for use in dropping a motorcycle and trailer from an airplane, comprising longitudinal frame members, the ends of which are curved into engaging relationship, channel members carried by certain of said curved ends of the frame, for engaging the tires of the motorcycle, transversely positioned curved frame members secured to the longitudinal frame members, said frame members comprising quick-detachable connections for the purposes of disassembly, sheet material for forming a trailer body, carried by approximately the lower half of the carrier, wheels and an axle therefor, in disassembled position in the carrier, and bearing means for said axle in said lower half of the carrier, whereby it may be readily converted into a trailer for the motorcycle.

10. A cargo carrying crate, comprising a continuous longitudinal frame extending completely around the cargo in a fore and aft direction, and a plurality of circular, transversely positioned frame members, pivotally mounted at diametrically opposite points on said longitudinal frame, whereby the circular frame members may be swung about their pivots into and out of the plane of the longitudinal frame, all of the framing elements being narrow, resilient metal strips, which form a light, springy, shock-absorbing open-work skeleton cage for the cargo.

11. A cargo carrying crate, comprising a continuous longitudinal frame extending completely around the cargo in a fore and aft direction, a plurality of circular, transversely positioned frame members pivotally mounted at diametrically opposite points on said longitudinal frame, whereby said transverse members may be swung about their pivots into and out of the plane of the longitudinal frame, all of the framing elements being narrow, resilient metal strips, which form a light springy, shock-absorbing open-work skeleton cage for the cargo, said circular frame members forming tires on which the crate may roll, and means for detachably securing the longitudinal and transverse framing elements, for ready assembly and disassembly.

12. A cargo carrying crate, comprising a longitudinal frame extending completely around the cargo in a fore and aft direction, said frame comprising overlapping members detachably secured together for varying the size of the frame, and a plurality of circular, transversely positioned frame members pivotally mounted at diametrically opposite points on said longitudinal frame, whereby the circular frame members may be swung about their pivots into and out of the plane of the longitudinal frame, said transversely positioned frame members comprising overlapping members detachably secured together for varying the size of the circular frames, all of said frame elements being narrow, resilient metal strips, cooperating to form a light, springy, shock-absorbing, open-work skeleton cage for the cargo.

13. A cargo carrying crate, comprising a continuous longitudinal frame having straight middle portions and curved ends, extending completely around the cargo in a fore and aft direction, and a plurality of transversely positioned frame members pivotally mounted at diametrically opposite points on said longitudinal frame, whereby the circular frame members may be swung about their pivots into and out of the plane of the longitudinal frame, all said frame elements being of narrow, resilient metal strips which form a light, springy, shock-absorbing open-work skeleton cage for the cargo, said cage being approximately of cylindrical shape with rounded ends.

14. A cargo carrying crate, comprising a continuous longitudinal frame having straight middle portions and curved ends, extending completely around the cargo in a fore and aft direction, a plurality of transversely positioned frame members pivotally mounted at diametrically opposite points on said longitudinal frame, whereby the circular frame members may be swung about their pivots into and out of the plane of the longitudinal frame, all said frame elements being of narrow, resilient metal strips which form a light, springy, shock-absorbing open-work skeleton cage for the cargo, said cage being approximately of cylindrical shape with rounded ends, said circular frame members acting as tires on which the crate may roll, and means for detachably securing the longitudinal and transverse framing elements, for ready assembly and disassembly.

15. A cargo carrying crate, comprising a longitudinal frame having straight, overlapping middle portions and curved, overlapping end portions, means for detachably securing said overlapping portions in various positions, for thereby varying the effective length and height of the longitudinal frame, and a plurality of transversely positioned circular frame members secured at intervals to said longitudinal frame, said transverse frame members comprising overlapping portions detachably secured together for varying their effective diameter, all said frame elements being of narrow, resilient, metal strips, cooperating to form a light, springy, shock-absorbing, open-work skeleton cage, having curved ends and of substantially cylindrical shape, whereby it will roll readily.

CHRISTIAN A. VOLF.